(12) United States Patent
Adachi

(10) Patent No.: US 10,496,251 B2
(45) Date of Patent: Dec. 3, 2019

(54) SCREEN CREATION APPARATUS HAVING APPLICATION SCREEN CREATION SUPPORT FUNCTION

(71) Applicant: FANUC Corporation, Yamanashi (JP)

(72) Inventor: Syuuzo Adachi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 99 days.

(21) Appl. No.: 15/285,511

(22) Filed: Oct. 5, 2016

(65) Prior Publication Data

US 2017/0109005 A1  Apr. 20, 2017

(30) Foreign Application Priority Data

Oct. 16, 2015 (JP) ................................. 2015-204533

(51) Int. Cl.
*G06F 3/048* (2013.01)
*G06F 3/0484* (2013.01)
*G06F 16/21* (2019.01)
*G06F 3/0482* (2013.01)

(52) U.S. Cl.
CPC .......... *G06F 3/0484* (2013.01); *G06F 3/0482* (2013.01); *G06F 16/219* (2019.01)

(58) Field of Classification Search
None
See application file for complete search history.

(56) References Cited

U.S. PATENT DOCUMENTS

| 6,580,438 | B1 | 6/2003 | Ichimura et al. | |
| 9,087,035 | B1 * | 7/2015 | Bandaru | G06F 17/248 |
| 2003/0160821 | A1 | 8/2003 | Yoon | |
| 2006/0253345 | A1 * | 11/2006 | Heber | G06Q 10/00 |
| | | | | 705/26.1 |
| 2009/0158167 | A1 * | 6/2009 | Wang | G06F 3/0482 |
| | | | | 715/745 |
| 2013/0086524 | A1 | 4/2013 | Nagao | |
| 2013/0311246 | A1 | 11/2013 | Heber | |

(Continued)

FOREIGN PATENT DOCUMENTS

| CN | 1441346 A | 9/2003 |
| CN | 103870281 A | 6/2014 |
| JP | 9-114621 A | 5/1997 |

(Continued)

OTHER PUBLICATIONS

Office Action in CN Application No. 201610898795.1, dated Jul. 12, 2018, 12pp.

(Continued)

*Primary Examiner* — Sanchita Roy
(74) *Attorney, Agent, or Firm* — Hauptman Ham, LLP

(57) ABSTRACT

A screen creation apparatus automatically collects the content of execution of a property edit of a component in a component edit history database as a history in a usual screen creation operation. Subsequently, the screen creation apparatus analyzes a set value by using an edit history in the component edit history database and the setting content of a component property characteristic database in usual edit operations when adding a new component, copying and pasting a component, and changing a property value. Thus, predicted set values are automatically set in all properties.

4 Claims, 12 Drawing Sheets

(56) References Cited

U.S. PATENT DOCUMENTS

2014/0026037 A1* 1/2014 Garb ................ G06F 17/30893
715/235

FOREIGN PATENT DOCUMENTS

| JP | 10-187425 A | 7/1998 |
|----|----|----|
| JP | 2001-228840 A | 8/2001 |
| JP | 2006099566 A | 4/2006 |
| JP | 2011159151 A | 8/2011 |
| JP | WO2011/154989 A1 | 8/2013 |
| JP | 2015-165372 A | 9/2015 |
| WO | 2011/154989 A1 | 12/2011 |

OTHER PUBLICATIONS

Office Action in DE Application No. 102016119174.4, dated Aug. 28, 2018, 11pp.
"Personal Computer", Wikipedia, original retrieved Aug. 10, 2018, https://de.wikipedia.org/w/index.phptitle=Personal_Computer &oldid. and translation retrieved Sep. 11, 2018, https://de.wikipedia.org/wikiPersonal_Computer, 35pp.

* cited by examiner

FIG.2

| LAMP | | DIFFERENCE INFORMATION INDICATING DIFFERENCE FROM LATEST SET VALUE 1 | | NUMBER OF TIMES OF EDIT | PREVIOUS SET VALUE HISTORY | | | | | |
|---|---|---|---|---|---|---|---|---|---|---|
| PROPERTY ITEM | PREDICTION SET VALUE | | PREDICTION AND ANALYSIS | | LATEST SET VALUE 1 | LATEST SET VALUE 2 | LATEST SET VALUE 3 | LATEST SET VALUE 4 | LATEST SET VALUE 5 | OLDEST SET VALUE |
| DISPOSITION COORDINATE | (10, 70) | DIFFERENT | Y COORDINATE IS INCREASED BY +10 | 20 | (10, 60) | (10, 50) | (10, 40) | (10, 30) | (10, 20) | ... |
| WIDTH/HEIGHT | (50, 10) | IDENTICAL | REMAIN SAME SIZE | 3 | (50, 10) | (50, 10) | (50, 10) | (50, 10) | (50, 10) | ... |
| LIGHTED SIGNAL | %M1240 | DIFFERENT | NUMBER OF LIGHTED SIGNALS IS INCREASED BY +2 | 20 | %M1238 | %M1236 | %M1234 | %M1232 | %M1230 | ... |
| FLASHING SIGNAL | %M1241 | DIFFERENT | NUMBER OF FLASHING SIGNALS IS INCREASED BY +2 | 20 | %M1239 | %M1237 | %M1235 | %M1233 | %M1231 | ... |
| LIGHTING COLOR On | YELLOW GREEN | IDENTICAL | REMAIN SAME COLOR | 3 | YELLOW GREEN | YELLOW GREEN | YELLOW GREEN | YELLOW GREEN | YELLOW GREEN | ... |
| LIGHTING COLOR Off | GRAY | IDENTICAL | REMAIN SAME COLOR | 3 | GRAY | GRAY | GRAY | GRAY | GRAY | ... |
| SHAPE | circleType3 | IDENTICAL | REMAIN SAME SHAPE | 3 | circleType3 | circleType3 | circleType3 | circleType3 | circleType3 | ... |
| DISPLAY INVALID SIGNAL SYMBOL NAME | OptionLamp | IDENTICAL | REMAIN SAME SYMBOL | 3 | OptionLamp | OptionLamp | OptionLamp | OptionLamp | OptionLamp | ... |
| ... | ... | ... | ... | ... | ... | ... | ... | ... | ... | ... |

FIG.3

| LAMP | COMPONENT PROPERTY CHARACTERISTIC DATABASE | | |
|---|---|---|---|
| PROPERTY ITEM | CATEGORY CHARACTERISTIC | PROPERTY CHARACTERISTIC | PREDICTION PRIORITY CHARACTERISTIC PARAMETERS |
| COORDINATE | NUMERICAL VALUES | ONLY X OR Y COORDINATES ARE SPACED APART AT REGULAR INTERVALS RETURN TO SAME COORDINATES AS THOSE OF HEAD COMPONENT AT EDGE OF RECTANGULAR BACKGROUND | ☐ ⦿ X PRIORITY DISPOSITION ◯ Y PRIORITY DISPOSITION ☐ GRID POINT DISPOSITION |
| WIDTH/HEIGHT | NUMERICAL VALUES | TEND TO REMAIN SAME SIZE AS THAT OF PREVIOUS TIME | |
| LIGHTED SIGNAL | PLC DEVICES | TEND TO BE DIFFERENT SIGNAL WITH EQAUL INTERVAL BIT DO NOT BECOME IDENTICAL WITH FLASHING SIGNAL OR DISPLAY INVALID SIGNAL | |
| FLASHING SIGNAL | PLC DEVICES | TEND TO BE DIFFERENT SIGNAL WITH EQAUL INTERVAL BIT DO NOT BECOME IDENTICAL WITH FLASHING SIGNAL OR DISPLAY INVALID SIGNAL | |
| LIGHTING COLOR On | COLORS | TEND TO REMAIN SAME COLOR | |
| LIGHTING COLOR Off | COLORS | TEND TO REMAIN SAME COLOR | |
| SHAPE | FLAGS/CODES | TEND TO REMAIN SAME SHAPE | |
| DISPLAY INVALID SIGNAL SYMBOL NAME | SYMBOLS | TEND TO HAVE SAME SIGNAL SETTING | ☐ THIS SIGNAL IS NOT ALWAYS SET |
| ... | ... | ... | ... |

FIG.12

| | NUMERICAL VALUES | PLC SYMBOLS | FLAGS/ NUMERICAL CODES | PLC DEVICE ADDRESSES | COLORS | CHARACTERS |
|---|---|---|---|---|---|---|
| | | | CATEGORY CHARACTERISTIC | | | |
| APPLICATION OF PREDICTION AND ANALYSIS PROCESS OF FIG. 11 | STEP SH01 | STEP SH01 | STEP SH01 | STEP SH01 | STEP SH01 | STEP SH01 |
| | | STEP SH02 | | | | STEP SH02 |
| FINAL PREDICTED VALUE | NUMERICAL VALUE | CHARACTER STRING IN WHICH NUMERICAL VALUE AND CHARACTER ARE MIXED | NUMERICAL VALUE | NUMERICAL VALUE | NUMERICAL VALUE | CHARACTER STRING IN WHICH NUMERICAL VALUE AND CHARACTER ARE MIXED |

SCREEN CREATION APPARATUS HAVING APPLICATION SCREEN CREATION SUPPORT FUNCTION

RELATED APPLICATIONS

The present application claims priority to Japanese Patent Application Number 2015-204533, filed Oct. 16, 2015, the disclosure of which is hereby incorporated by reference herein in its entirety.

BACKGROUND OF THE INVENTION

1. Field of the Invention

The present invention relates to a screen creation apparatus, and particularly relates to a screen creation apparatus having a function of supporting property setting in creation of an application screen.

2. Description of the Related Art

As components for creating a common application screen, a combo box, a checkbox, an option button, and a button control are prepared. In addition, in an operator panel screen application that operates a machine, as software components that simulate hardware components, a lamp, a button, and a numerical value input/output display component are prepared. Each of the components has a mechanism that allows setting of a position, a size, a shape, a color, and a signal as a plurality of property items.

In order to create the application screen, it is necessary to dispose a large number of components of many types. At this point, an operation of setting the property items of each component individually is required, and the operation has required time and labor. In order to solve such a problem, for example, Japanese Patent Application Laid-open No. 2006-099566 discloses a technique for reducing the time and labor by creating the property setting content that is applied in common in advance and, when application of the common setting to a component disposed in the screen is selected, applying a property set by the common setting to the component collectively. In addition, Japanese Patent Application Laid-open No. 2011-159151 discloses a technique for performing the property setting efficiently by using a plurality of setting item values of a disposed component in value setting (changing) of the corresponding setting items in other components for which the setting is completed.

However, in the conventional art, in order to perform an efficient edit in the screen creation, it is necessary to perform preparation operations such as selection of the property item and setting of the value in advance, and a problem arises in that the preparation operations require time and labor. In addition, a problem arises in that the target of the efficient edit with reduced time and labor is limited only to the selected property item.

SUMMARY OF THE INVENTION

To cope with this, an object of the present invention is to provide a screen creation apparatus having a function of efficiently supporting the property setting in the creation of the application screen.

In the present invention, the problem that the edit requires time and labor is solved by including a portion in which a component property characteristic database that manages an essential characteristic of each property item of a component and a characteristic of the property item given by a screen creator is created, a portion in which a component edit history database is automatically created by collecting the content of the edit of the property item when an existing component or a new component is disposed or all components in an existing screen and their property setting states, a portion in which a set value predicted as the set value of the next property item is created from these two databases, a portion in which this value is initially set in the disposition of the new component, a portion in which a list of the set value of each component is displayed based on the rank of the property item that is frequently changed previously, and a portion in which a list display of predicted second and subsequent candidate set values is displayed for each property.

A screen creation apparatus according to the present invention executes application screen creation software for creating an application screen in which a display component provided with property items is disposed, and includes a component edit history database that records an edit history of each property item of the display component, a component property characteristic database in which a category characteristic of each property item of the display component, a property characteristic indicative of a setting tendency of a property in the category characteristic, and a prediction priority characteristic parameter are stored in association with each other, a component edit history database analysis section that analyzes the component edit history database, and anew component all property initial value creation section that creates, when the display component is disposed in the application screen, an initial value of each property item of the display component based on a result of the analysis of the component edit history database analysis section, and sets the initial value in each property item of the display component.

The screen creation apparatus may further include an edit frequency order property list creation section that creates a display list in which the property items of the display component disposed in the application screen are arranged in descending order of edit frequency, based on the result of the analysis of the component edit history database analysis section, and the display list created by the edit frequency order property list creation section may be displayed when a set value of each property item of the display component disposed in the application screen is confirmed or edited.

The edit frequency order property list creation section may further have a function of creating difference information indicative of whether or not an immediately previous set value of each property item of a component is different from a current set value of the property item of the same component based on the result of the analysis of the component edit history database analysis section, and the property item may be displayed such that a display mode of the property item differs based on the difference information when the set value of each property item of the display component disposed in the application screen is confirmed or edited.

The screen creation apparatus may further include an existing component property value edit prediction data creation section that creates a predicted value candidate list of the second and subsequent predicted value candidates of each property item of the display component disposed in the application screen, based on the result of the analysis of the component edit history database analysis section, and the predicted value candidate list may be displayed when the set value of each property item of the display component disposed in the application screen is edited.

A selection that is to be prioritized when prediction and analysis are performed may be set in the prediction priority characteristic parameter registered in the component property characteristic database, and the component edit history database analysis section may analyze the component edit history database in consideration of a prioritized item set in the prediction priority characteristic parameter.

According to the present invention, since the predicted values created by the analysis of the component property characteristic database and the component edit history database are set in all of the properties of the new component without performing the edit preparation operation in advance, the time and labor related to the setting of the property value that is intensively performed at the time of new disposition and the time and labor when the property value of the disposed component is confirmed/changed are significantly reduced.

BRIEF DESCRIPTION OF THE DRAWINGS

The above and other objects and novel features of the present invention will become apparent from the following description of preferred embodiments given in conjunction with the accompanying drawings, in which:

FIG. 2 is a view showing an example of a component edit history database in the screen creation apparatus of FIG. 1;

FIG. 3 is a view showing an example of a component property characteristic database in the screen creation apparatus of FIG. 1;

FIG. 12 is a view showing a list of a prediction and analysis process applied in each category characteristic that is executed by the screen creation apparatus of FIG. 1.

DETAILED DESCRIPTION OF THE PREFERRED EMBODIMENTS

Figure 1:
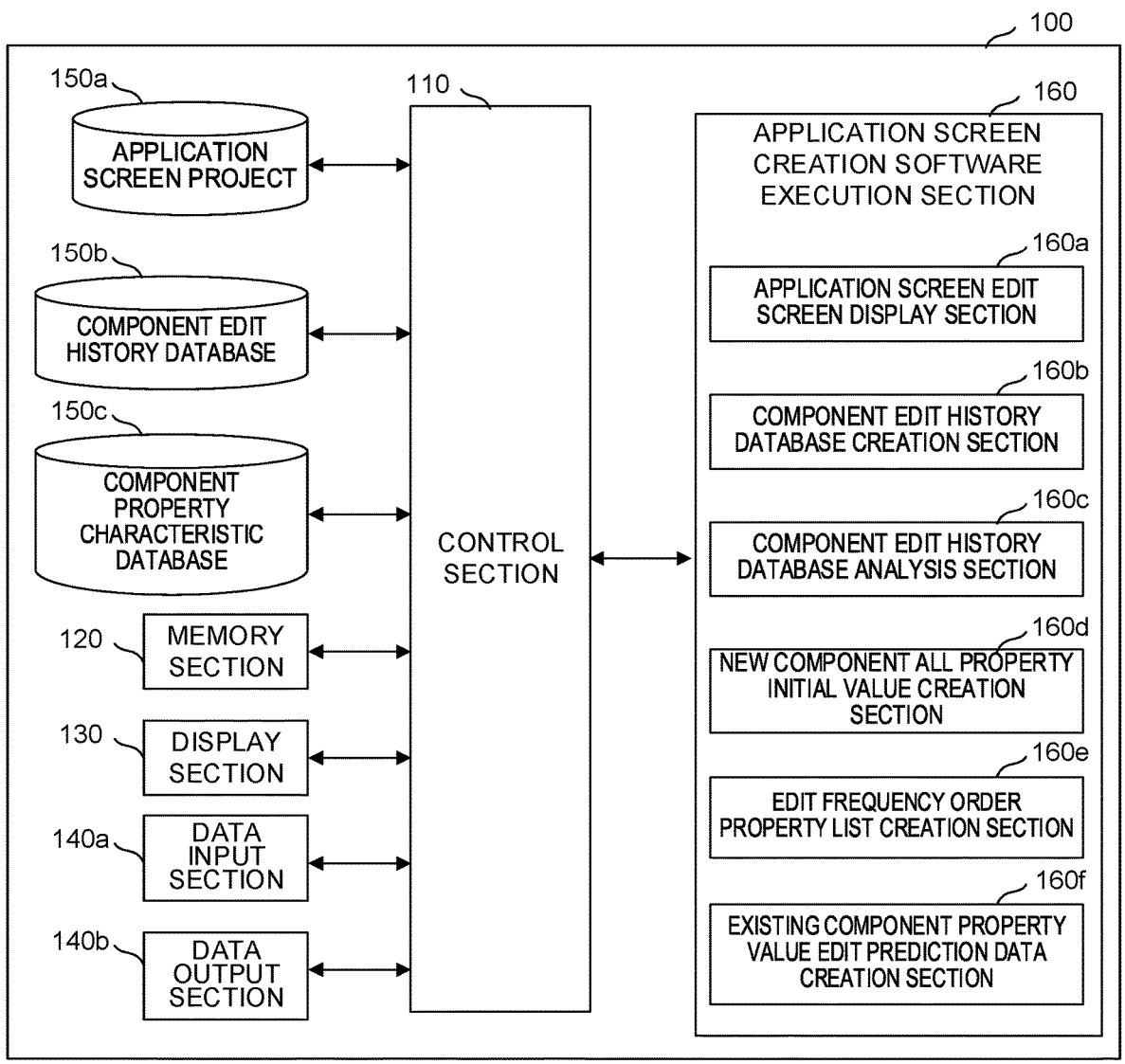
FIG. 1 is an internal configuration diagram of a screen creation apparatus according to an embodiment of the present invention.

The internal configuration of a screen creation apparatus according to an embodiment of the present invention will be described by using FIG. 1.

A screen creation apparatus 100 automatically collects the content of execution of a property edit of a component in a component edit history database 150b as a history in a usual screen creation operation. Subsequently, the screen creation apparatus 100 analyzes a set value by using the edit history in the component edit history database 150b and a setting content of a component property characteristic database 150c in usual edit operations when adding a new component, copying and pasting a component, and changing a property value without an operation for using an explicitly efficient edit function. As a result, predicted set values are automatically set in all properties, whereby an efficient edit is executed.

In addition, when the screen creation apparatus 100 creates an application screen, the screen creation apparatus 100 performs the property edit of the component in the screen and, at the same time, collects the edit content in the component edit history database 150b. Subsequently, when the screen creation apparatus 100 performs new disposition of the next component and the property edit of the existing component, the screen creation apparatus 100 performs prediction and analysis of the set value based on the change of the collected edit history and the characteristic content of the property in the component property characteristic database 150c. As a result, even when a screen creator does not input the property set value, the predicted value is set or shown in a predicted value list, and hence it is possible to reduce the time and labor for the screen creation.

An example of the component edit history database 150b in the screen creation apparatus 100 of FIG. 1 will be described by using FIG. 2.

In the component edit history database 150b, the edit history and the number of times of the edit of the set value previously performed on the property item of the component, a prediction and analysis result obtained by analyzing the above information (for example, in FIG. 2, with regard to the property item "DISPOSITION COORDINATE", "Y COORDINATE IS INCREASED BY +10" every time the edit is performed is predicted by analysis), difference information indicating a difference from an immediately previous property value, and the predicted value of the property item value in the next edit are registered for each property item of each component constituting the application screen.

Further, in order to reduce the time and labor of the screen creator, in the screen creation apparatus 100, the property that is frequently changed previously is preferentially displayed in the list, whereby the time and labor for a tab selection operation displayed in a window and a scrolling operation in the case where the item is hidden and a movement distance of eyes are significantly reduced in a confirmation operation of the predicted set value. Further, in preparation for the case where the predicted set value is not a desired value, a list of the second and subsequent candidate set values created by the analysis of the component edit history database 150b is displayed, whereby the time and labor for change of the predicted set value are also significantly reduced.

Returning to FIG. 1, the individual constituent elements of the screen creation apparatus 100 will be described.

The screen creation apparatus 100 is constituted by a personal computer that creates screen data, and includes a control section 110, a memory section 120, a display section 130, a data input section 140a, and a data output section 140b. In a data storage section (not shown) constituted by a hard disk of the screen creation apparatus 100, an application screen project 150a, the component edit history database 150b, and the component property characteristic database 150c are provided. Application screen creation software is executed on the screen creation apparatus 100, whereby an application screen creation software execution section 160 functions.

The application screen creation software execution section 160 includes an application screen edit screen display section 160a, a component edit history database creation section 160b, a component edit history database analysis section 160c, a new component all property initial value creation section 160d, an edit frequency order property list creation section 160e, and an existing component property value edit prediction data creation section 160f.

The application screen edit screen display section 160a implements an application screen project edit screen stored in the application screen project 150a, and causes the display section 130 to display the application screen and the component in the screen. The component edit history database creation section 160b collects the content of the edit of the property item of the existing component or a component when the component is newly disposed, or all of the components in the existing screen and their property setting states. The component edit history database analysis section 160c creates the set value predicted as the set value of the next property by utilizing the component edit history database 150b and the component property characteristic database 150c. The new component all property initial value creation section 160d functions when the new component is disposed in the screen. The edit frequency order property list creation section 160e creates a property list based on ascending order of edit frequency at the time of the edit of the property of the existing component. The existing component property value edit prediction data creation section 160f creates property value edit prediction data used when the selected property in the existing component is edited.

Next, operations of individual functional units of the application screen creation software execution section 160 will be described.

The application screen edit screen display section 160a has a function of creating the application screen for a programmable display. First, the application screen edit screen display section 160a causes the display section 130 to display the application screen constituted by a group of components based on the application screen project 150a to perform whole operations related to the property edit of the component.

The component edit history database creation section 160b collects the component type, the disposition coordinate, the type of the property, and the content of the set value as the edit content of the component delivered from the application screen edit screen display section 160a by a screen creator via the data input section 140a in the component edit history database 150b as an edit history of the component with the number of times of the edit added to the edit history. In addition, in preparation for the case where the component once disposed on the screen is deleted, the component edit history database creation section 160b has a function of deleting edit history data of the deleted component.

Further, the component edit history database creation section 160b has a function of registering, from the existing edited created screen, the setting content of the property of each of all of the components disposed in the screen in the component edit history database 150b in order of component display in the screen collectively at an arbitrary timing to thereby renew the database. With this, it is possible to eliminate an influence on prediction and analysis by the property set value in another screen, and perform the prediction and analysis corresponding to a creation pattern of the screen to be edited. In addition, it becomes possible to use the present invention also in the application screen project 150a created by the application screen creation software execution section 160 of the previous version.

By the function of the component edit history database creation section 160b described above, the component edit history database 150b that is collected at the time of the property edit of each component and shown in FIG. 2 as an example is created.

The component edit history database analysis section 160c has a function of analyzing the predicted set value of the property of the component requested by each of the new component all property initial value creation section 160d, the edit frequency order property list creation section 160e, and the existing component property value edit prediction data creation section 160f described later from the collected component edit history database 150b, and delivering the analysis result to each request source.

First, a characteristic in the component property characteristic database 150c will be described. In the present invention, "the characteristic of the property" means the quality (tendency) of the value set in the property item of the component in the case where, with regard to the component disposed in the screen to be created, the type of the component, the type of the set value of the property item of the component, relations with the other components disposed in the same screen are considered. For example, in the case of the property item of a lighted signal of the component, the lighted signal of the component has a characteristic such that the lighted signals of the same components in the same screen are different from each other with a high probability. On the other hand, an interlock signal of a button component has a characteristic such that the interlock signals of the same components in the same screen are identical with each other with a high probability. In the present invention, by utilizing the fact that the characteristic of the property classified by category is a factor in the determination of the direction of analysis, in the component property characteristic database 150c, a prediction priority characteristic parameter is registered in order to easily derive the predicted value that meets the intention of the screen creator. An example of the prediction priority characteristic parameter includes a parameter for the screen creator to determine the selection to be prioritized when the prediction and analysis are performed such as whether an X coordinate or a Y coordinate is prioritized when the prediction and analysis of the component disposition coordinate is performed. With this, it is possible to control the prediction and analysis so as to meet the intention of the screen creator and the intention peculiar to the screen in process of creation, and hence it becomes possible to perform flexible analysis.

Thus, in the analysis process in the component edit history database analysis section 160c, the output of the predicted value is controlled with the component property characteristic database 150c constituted by the category characteristic indicative of a data attribute of the property value itself, the property characteristic, and the prediction priority characteristic parameter. In addition to the prediction and analysis based on the characteristic, the component edit history database analysis section 160c has a function of analyzing a device address portion of a PLC, the fluctuation width of each of a numeric character and a numeric data portion, and the cyclic regularity of the set value to determine the predicted set value.

An example of the component property characteristic database 150c in the screen creation apparatus 100 of FIG. 1 will be described by using FIG. 3.

The component property characteristic database 150c is provided with default characteristic values of all of the components before the component edit history database analysis section 160c is executed and, with regard to the prediction priority characteristic parameter, the setting thereof can be changed at an arbitrary timing by a designer who designs the application screen and the characteristic of the component disposed in the application screen.

The process of the new component all property initial value creation section 160d is executed when the operation of disposing the new component in the screen or the operation of pasting a copy component is performed by the application screen edit screen display section 160a. Note that, in the operation of pasting the copy component, a selection of whether the new component all property initial value creation section 160d is used or the copy component is treated as the copy of the conventional component can be made by programmable setting of the application screen edit screen display section 160a. The new component all property initial value creation section 160d causes the component edit history database analysis section 160c to operate, sets predicted values in all of the properties of the specified component from the component edit history database 150b, and delivers created new component information to the application screen edit screen display section 160a. The application screen edit screen display section 160a causes the display section 130 to display the new component with the component shape and the color scheme as the predicted values at the position of predicted disposition coordinate in the screen in process of creation.

The process of the edit frequency order property list creation section 160e is executed when the operation of confirming or editing the property of the component disposed in the screen is performed by the application screen edit screen display section 160a. The edit frequency order property list creation section 160e causes the component edit history database analysis section 160c to operate, and based on "the number of times of the edit" and chronological registration order data obtained from the component edit history database 150b, creates a display list in which all of the properties of the specified component are arranged in descending order of edit frequency or in reverse chronological order when the properties have the same edit frequency and information indicative of whether or not the predicted value is different from the immediately previous set property value of the same component or the default set value in the case where the immediately previous set property value is not present. The edit frequency order property list creation section 160e then delivers the display list and the information to the application screen edit screen display section 160a. The application screen edit screen display section 160a causes the display section 130 to display the acquired edit frequency order property list as a property change dialog, and the application screen edit screen display section 160a has a display characteristic such that the visual recognition of the screen creator is increased by referring to the information indicative of whether or not the set property value of a component in the displayed property list is different from the immediately previous set property value of the component, and setting a background color or a rectangular frame color of the set value that is determined to be different from the immediately previous set property value to a color that allows a distinction from the set value that is the same as the immediately previous set property value, or additionally displaying a notice icon indicating that the set value is different from the immediately previous set property value.

The process of the existing component property value edit prediction data creation section 160f is executed when an edit operation for changing the property value selected from the edit frequency order property list in the property change dialog of the component disposed in the screen is performed by the application screen edit screen display section 160a. The existing component property value edit prediction data creation section 160f causes the component edit history database analysis section 160c to operate, creates a predicted value candidate list of the second and subsequent predicted value candidates by analyzing only the property value of the specified component from the component edit history database 150b, and delivers the list to the application screen edit screen display section 160a. The application screen edit screen display section 160a causes the display section 130 to display the acquired predicted value candidate list of the second and subsequent predicted value candidates.

Hereinbelow, the flows of the individual processes executed in the screen creation apparatus 100 will be described by using respective flowcharts.

Figure 4:
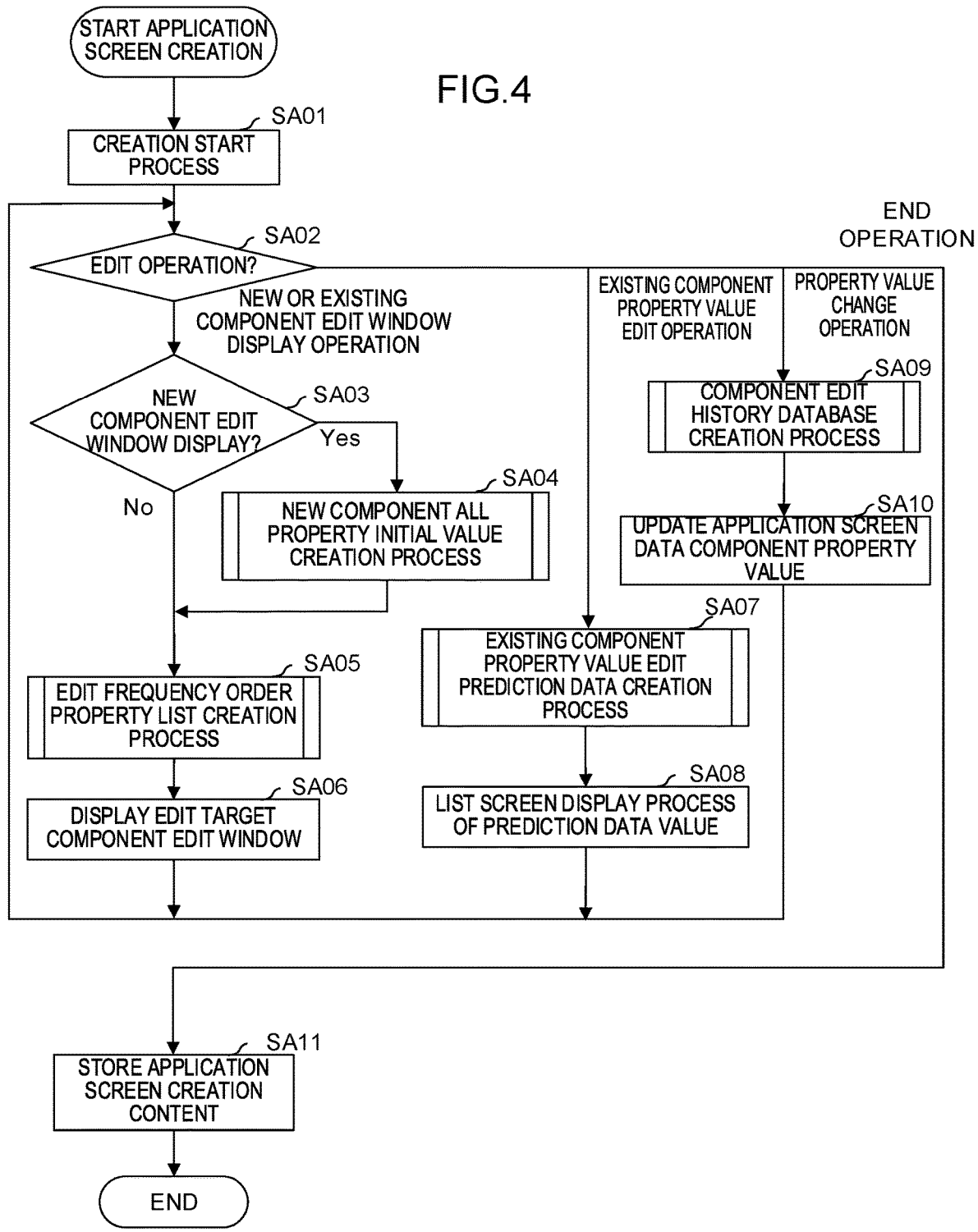
FIG. 4 is a flowchart showing an overall flow of an application screen creation process executed in an application screen creation software execution section in the screen creation apparatus of FIG. 1.

FIG. 4 is a flowchart showing the overall flow of the application screen creation process executed in the application screen creation software execution section 160. Hereinbelow, the description will be made according to individual steps.

[Step SA01] Based on the operation by the screen creator, the existing application screen creation content is read from a data storage section (not shown) or the creation of the new application screen is performed, and the creation screen of the application screen is displayed in the display section 130.

[Step SA02] The operation by the screen creator is detected, and the edit operation performed by the screen creator is determined. The flow proceeds to Step SA03 in the case where the edit operation is "new or existing component edit window display operation", the flow proceeds to Step SA07 in the case where the edit operation is "existing component property value edit operation", the flow proceeds to Step SA09 in the case where the edit operation is "property value change operation", and the flow proceeds to Step SA11 in the case where the edit operation is "end operation".

[Step SA03] It is determined whether or not the operation by the screen creator is window display of the new component. The flow proceeds to Step SA04 in the case where the operation is edit window display of the new component and, otherwise, the flow proceeds to Step SA05.

[Step SA04] The new component all property initial value creation section 160d is instructed to execute a new component all property initial value creation process.

[Step SA05] The edit frequency order property list creation section 160e is instructed to execute an edit frequency order property list creation process.

[Step SA06] An edit target component edit window is displayed based on the property list created in Step SA05. When the window is displayed, the window is displayed in the display section 130 with the background color or the rectangular frame color corresponding to the difference information indicating the difference from the immediately previous property value, and the flow returns to Step SA02.

[Step SA07] The existing component property value edit prediction data creation section 160f is instructed to execute an existing component property value edit prediction data creation process.

[Step SA08] The list of the prediction data value is displayed in the display section 130 based on the prediction data value created in Step SA07, and the flow returns to Step SA02.

[Step SA09] The component edit history database creation section 160b is instructed to execute a component edit history database creation process.

[Step SA10] The property value of the component disposed in the application screen is updated based on the operation of the screen creator, and the flow returns to Step SA02.

[Step SA11] The creation content of the created application screen is stored in the data storage section, and the present processing is ended.

Figure 5:
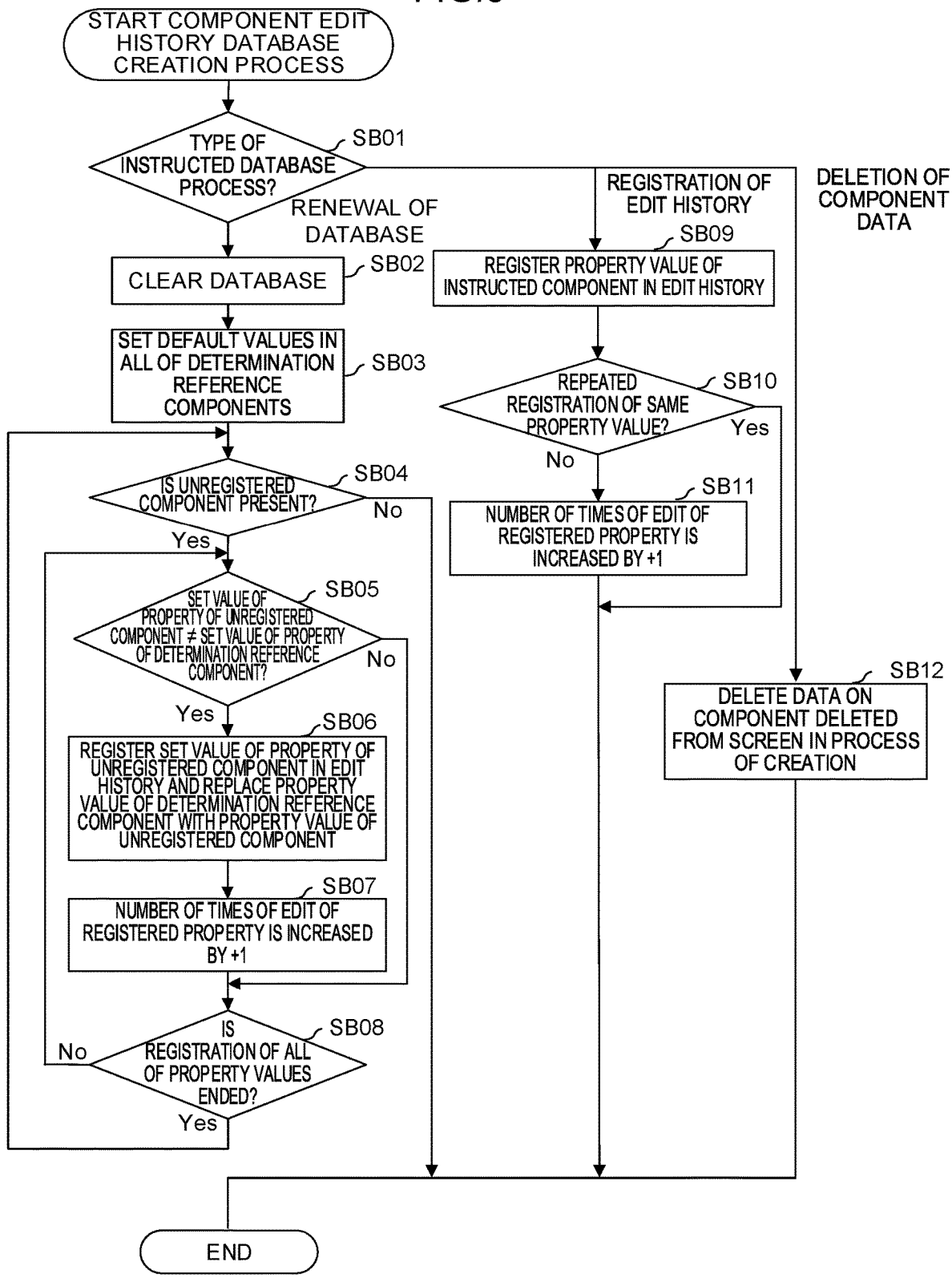
FIG. 5 is a flowchart showing a flow of a component edit history database creation process executed in a component edit history database creation section in the screen creation apparatus of FIG. 1.

FIG. 5 is a flowchart showing the flow of the component edit history database creation process executed in the component edit history database creation section 160b. Hereinbelow, the description will be made according to individual steps.

[Step SB01] The type of the instructed database process is determined. The flow proceeds to Step SB02 in the case where the instructed database process is "renewal of the database", the flow proceeds to Step SB09 in the case where the instructed database process is "registration of the edit history", and the flow proceeds to Step SB12 in the case where the instructed database process is "deletion of the component data".

[Step SB02] The component edit history data of each component registered in the component edit history database 150b is cleared.

[Step SB03] Models of all determination reference components in which the set values of the properties are the default set values are prepared. [Step SB04] It is determined whether or not an unregistered component of which the edit history is not registered in the component edit history database 150b is present by referring to the components disposed in the order in which they are displayed in the application screen of which the registration is specified in the order in which they are displayed. The flow proceeds to Step SB05 in the case where the unregistered component is present, and the present processing is ended in the case where the unregistered component is not present.

[Step SB05] It is determined whether or not the set value of the property of the unregistered component detected in Step SB04 is different from the default set value of the model component. The flow proceeds to Step SB06 in the case where the set value thereof is different from the default set value thereof, and the flow proceeds to Step SB08 in the case where the set value thereof is identical with the default set value thereof.

[Step SB06] The set value of the property of the unregistered component detected in Step SB04 is registered in the component edit history database 150b as the edit history, and the property value of the model component is replaced with the property value of the unregistered component.

[Step SB07] The number of times of the edit of the registered property is increased by 1.

[Step SB08] It is determined whether or not the registration of the histories of all of the property values of the unregistered component detected in Step SB04 is ended. The flow returns to Step SB04 and the history registration of the next component is started in the case where the registration thereof is ended, and the flow returns to Step SB05 and the registration of the property of which the history is not registered is started in the case where the registration thereof is not ended.

[Step SB09] The set value of the property of the component of which the registration is instructed is registered in the edit history.

[Step SB10] It is determined whether or not the property item of the component of which the registration is instructed is different from the property item of the component that is immediately previously registered. The flow proceeds to Step SB11 in the case where the property item thereof is different from the property item of the component that is immediately previously registered and, in the case where the property item thereof is identical with the property item of the component that is immediately previously registered, in order to avoid repeated registration of the property item of the same component as the previous component, the present processing is ended.

[Step SB11] The number of times of the edit of the registered property is incremented by 1, and the present processing is ended.

[Step SB12] The component edit history data of the component deleted from the screen in process of creation is deleted from the component edit history database 150b, and the present processing is ended.

Figure 6:
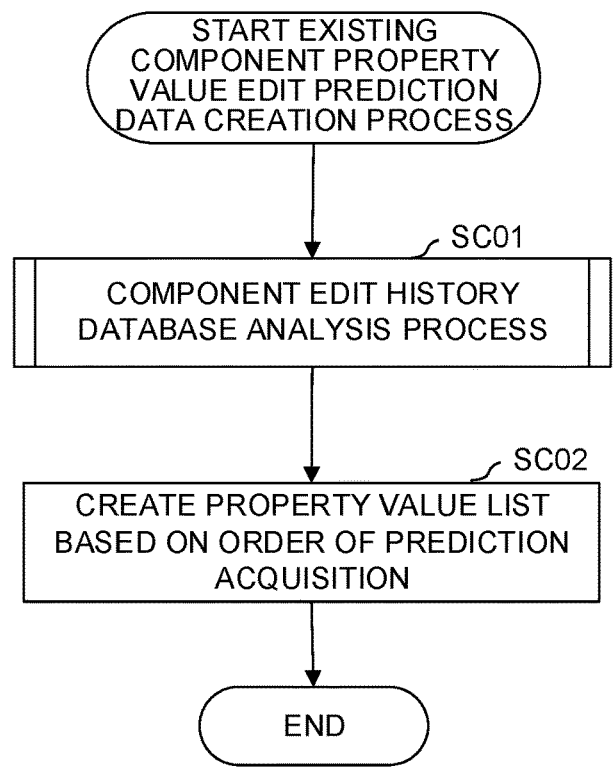
FIG. 6 is a flowchart showing a flow of a process executed in an existing component property value edit prediction data creation section in the screen creation apparatus of FIG. 1.

FIG. 6 is a flowchart showing the flow of the existing component property value edit prediction data creation process executed in the existing component property value edit prediction data creation section 160f.

[Step SC01] All of the predicted value candidates predicted by the analysis of the component edit history database analysis section 160c are acquired.

[Step SC02] The predicted value candidate list of the second and subsequent predicted value candidates of the property selected for the edit of the existing component is created based on all of the acquired predicted value candidates.

Figure 7:
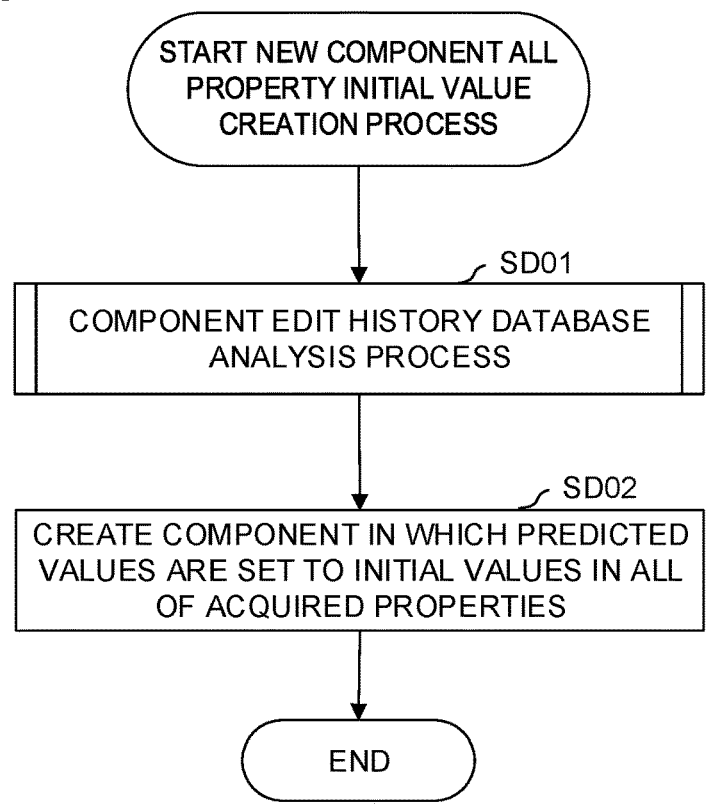
FIG. 7 is a flowchart showing a flow of a process executed in a new component all property initial value creation section in the screen creation apparatus of FIG. 1.

FIG. 7 is a flowchart showing the flow of the new component all property initial value creation process executed in the new component all property initial value creation section 160d.

[Step SD01] The initial predicted values of all of the properties predicted by the analysis of the component edit history database analysis section 160c are acquired.

[Step SD02] The new component in which the predicted values of the set values of all of the properties are set to the initial values is created based on the acquired initial predicted values.

Figure 8:
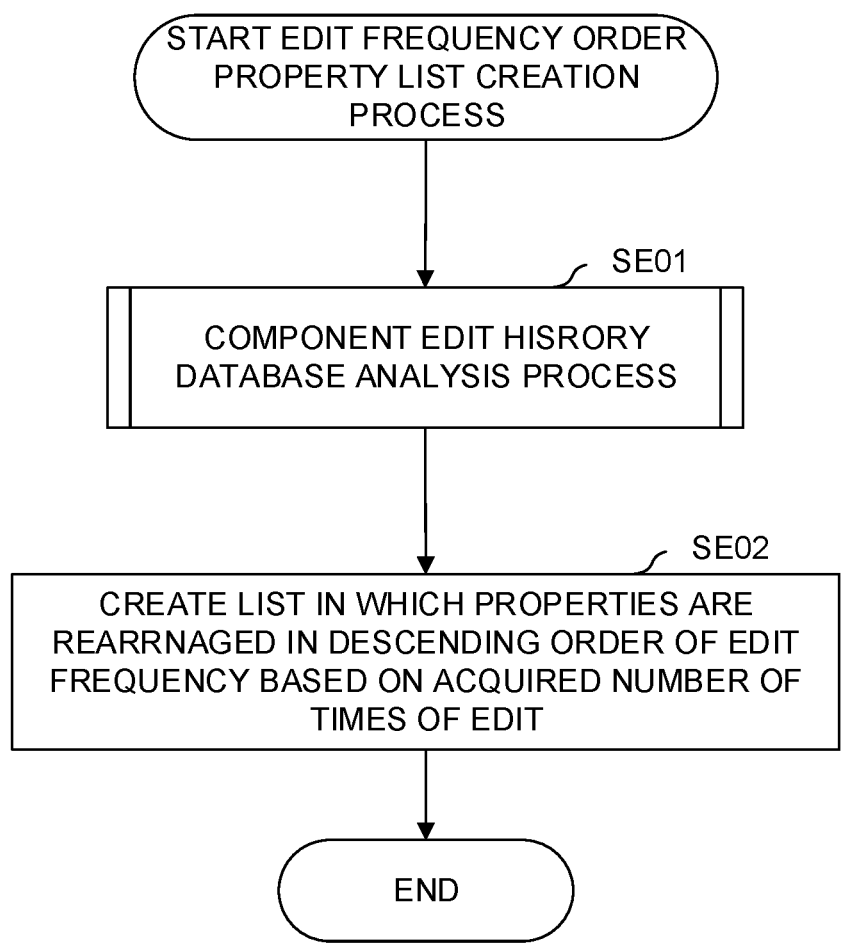
FIG. 8 is a flowchart showing a flow of a process executed in an edit frequency order property list creation process section in the screen creation apparatus of FIG. 1.

FIG. 8 is a flowchart showing the flow of the edit frequency order property list creation process executed in the edit frequency order property list creation section 160e.

[Step SE01] An edit frequency value, the property item name, and the difference information indicating the difference from the immediately previous property value are acquired by the analysis of the component edit history database analysis section 160c.

[Step SE02] Based on the information acquired in Step SE01, the property list in which the property item name and the difference information are combined and rearranged in descending order of edit frequency, for displaying the list of the property edit in descending order of edit frequency for the edit property of the new component is created.

Figure 9:
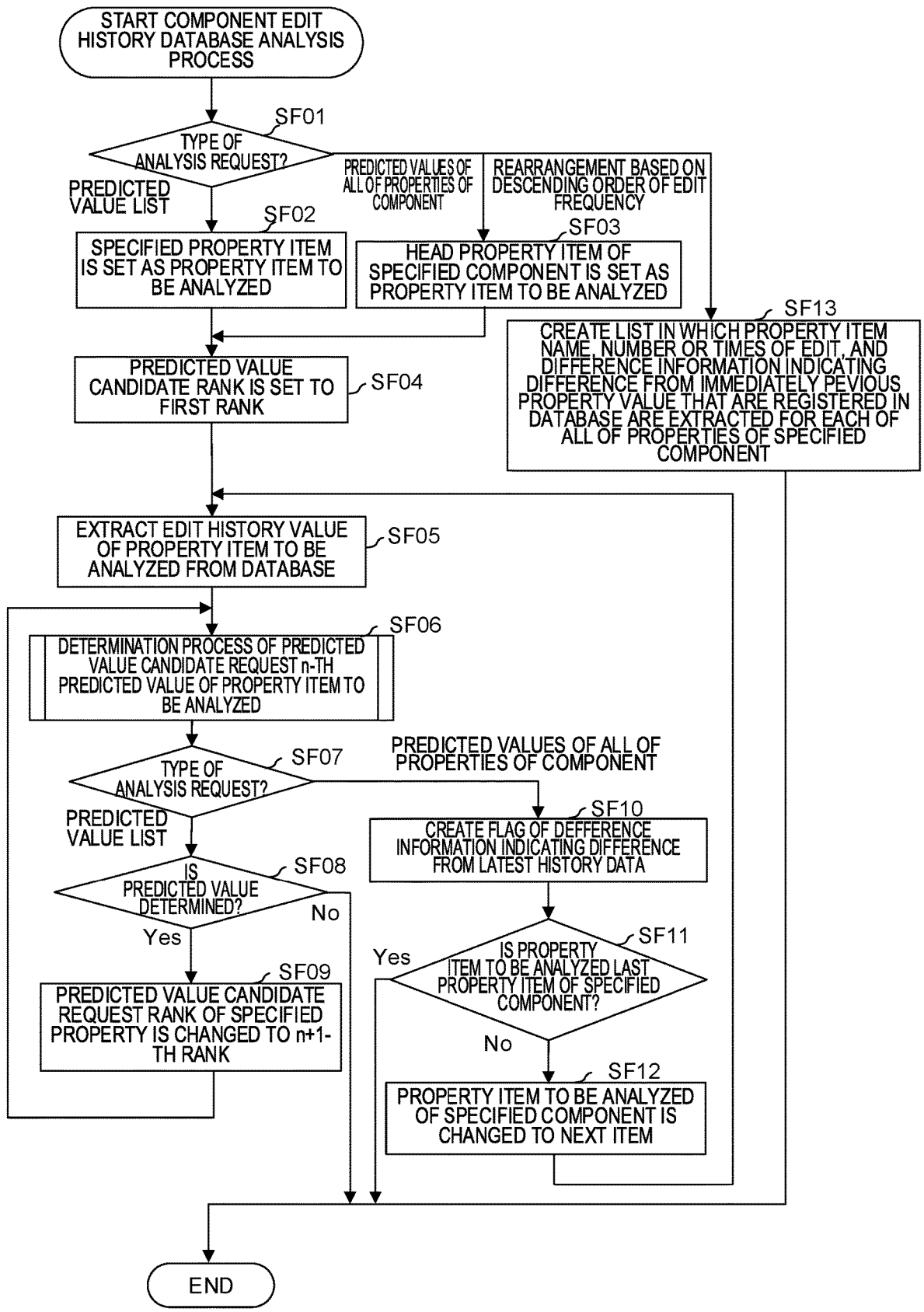
FIG. 9 is a flowchart showing a flow of a process executed in a component edit history database analysis section in the screen creation apparatus of FIG. 1.

FIG. 9 is a flowchart showing the flow of a component edit history database analysis process executed in the component edit history database analysis section 160c. Hereinbelow, the description thereof will be made according to individual steps.

[Step SF01] The type of the required analysis request process is determined. The flow proceeds to Step SF02 in the case where the analysis request is "creation of the predicted value list", the flow proceeds to Step SF03 in the case where the analysis request is "prediction of all of the property values of the component", and the flow proceeds to Step SF13 in the case where the analysis request is "rearrangement based on descending order of edit frequency".

[Step SF02] The specified property item is set as the property item to be analyzed.

[Step SF03] The head property item of the specified component is set as the property item to be analyzed.

[Step SF04] A predicted value candidate rank is set to the first rank.

[Step SF05] An edit history value of the property item to be analyzed is acquired from the component edit history database 150b.

[Step SF06] With regard to the property item to be analyzed, a determination process of the predicted value candidate request n-th predicted value is executed.

[Step SF07] The type of the required analysis request process is determined. The flow proceeds to Step SF08 in the case where the analysis request is "creation of the predicted value list", and the flow proceeds to Step SF10 in the case where the analysis request is "prediction of all of the property values of the component".

[Step SF08] It is determined whether or not the predicted value is determined. The flow proceeds to Step SF09 in the case where the predicted value is determined, and the present processing is ended in the case where the predicted value cannot be determined.

[Step SF09] The predicted value candidate request rank of the specified property is changed to the n+1-th rank, and the flow returns to Step SF06.

[Step SF10] A difference information flag indicative of presence or absence of a difference between the latest property value history data and the predicted value is created.

[Step SF11] It is determined whether or not the current property item to be analyzed is the last property item of the specified component. The present processing is ended in the case where the current property item to be analyzed is the last property item, and the flow proceeds to Step SF12 in the case where the current property item to be analyzed is not the last property item.

[Step SF12] The property item to be analyzed of the specified component is changed to the next property item, and the flow returns to Step SF05.

[Step SF13] A list in which the property item name, the number of times of the edit, and the difference information indicating the difference from the immediately previous property value are extracted for each of all of the properties of the specified component registered in the component edit history database 150b is created, and the present processing is ended.

Figure 10:
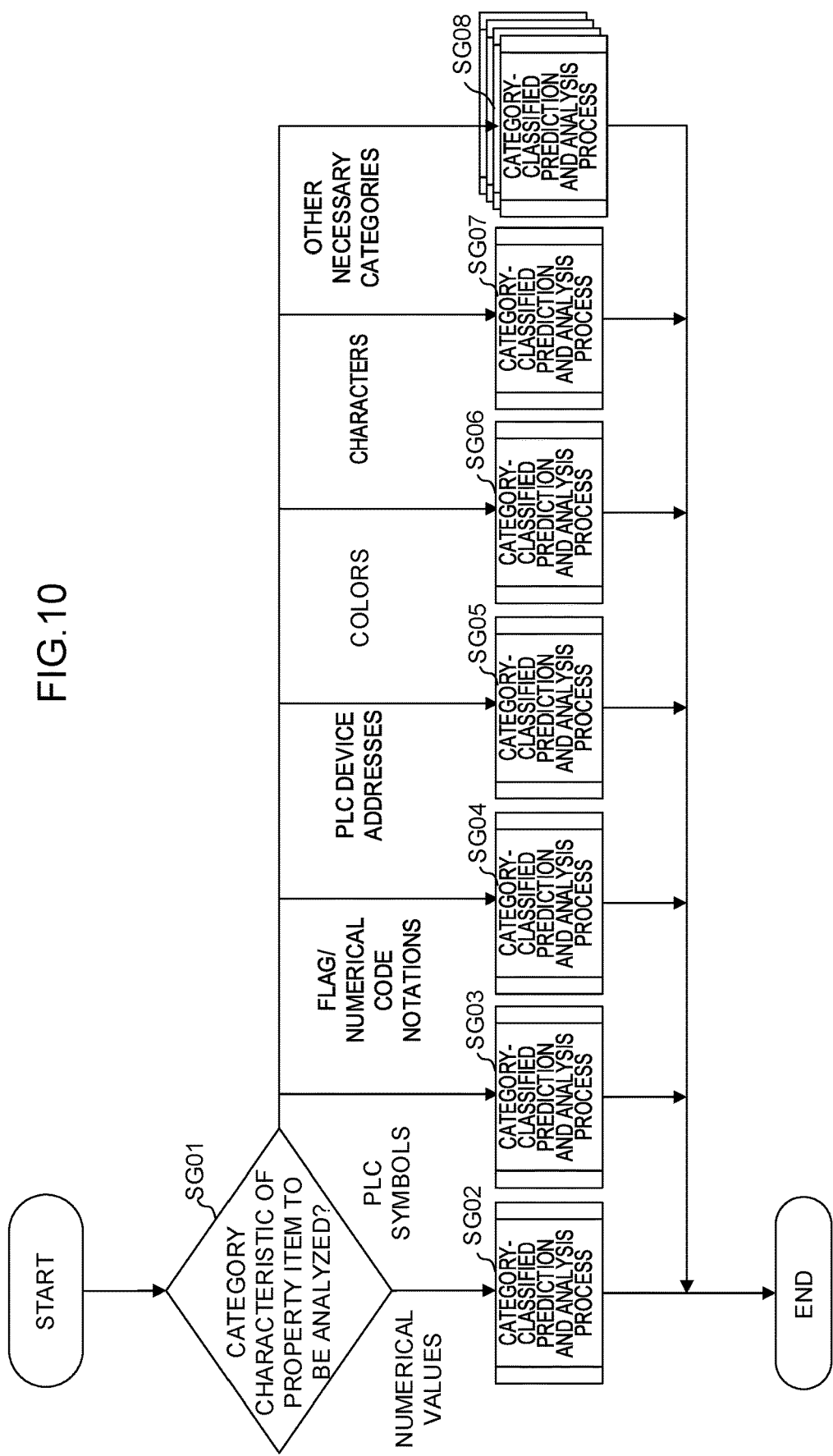
FIG. 10 is a flowchart showing a flow of a process (property item predicted value determination process) executed in Step SF06 in FIG. 9.

FIG. 10 is a flowchart showing the flow of the process executed in Step SF06 in FIG. 9.

[Step SG01] The characteristic of the category of the property item to be analyzed is determined. The flow proceeds to Step SG02 in the case where the characteristic is "numerical values", the flow proceeds to Step SG03 in the case where the characteristic is "PLC symbols", the flow proceeds to Step SG04 in the case where the characteristic is "flag/numerical code notations", the flow proceeds to Step SG05 in the case where the characteristic is "PCL device addresses", the flow proceeds to Step SG06 in the case where the characteristic is "colors", the flow proceeds to Step SG07 in the case where the characteristic is "characters", and the flow proceeds to Step SG08 in the case where the characteristic is "other necessary categories".

[Step SG02] A category-classified prediction and analysis process related to the numerical values is executed on the property item to be analyzed.

[Step SG03] The category-classified prediction and analysis process related to the PLC symbols is executed on the property item to be analyzed.

[Step SG04] The category-classified prediction and analysis process related to the flag/numerical code notations is executed on the property item to be analyzed.

[Step SG05] The category-classified prediction and analysis process related to the PLC device addresses is executed on the property item to be analyzed.

[Step SG06] The category-classified prediction and analysis process related to the colors is executed on the property item to be analyzed.

[Step SG07] The category-classified prediction and analysis process related to the characters is executed on the property item to be analyzed.

[Step SG08] The category-classified prediction and analysis process corresponding to each category is executed on the property item to be analyzed.

The category-classified prediction and analysis processes from Step SG02 to Step SG08 of the process of determining the predicted value candidate request n-th predicted value of the property item to be analyzed in FIG. 10 can be determined according to the quality of the set value related to each category.

Figure 11:
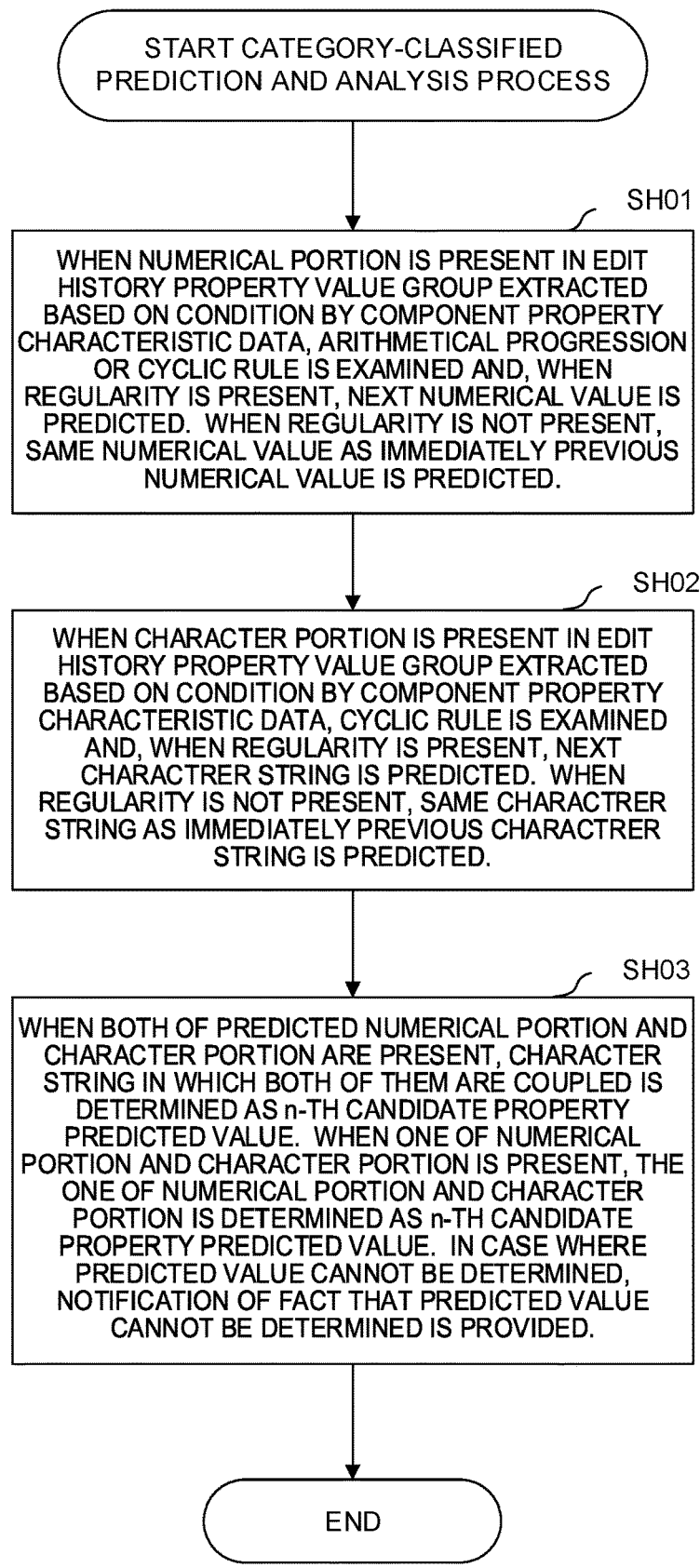
FIG. 11 is a flowchart showing a flow of a category-classified prediction and analysis process executed by the screen creation apparatus of FIG. 1.

FIG. 11 is a flowchart showing an example of the flow of the category-classified prediction and analysis process. Note that a process (Step SH02) of a character portion in the process example in the flowchart corresponds to each of the category-classified prediction and analysis processes related to the PLC symbols and the characters in Step SG03 and Step SG07 in the flowchart in FIG. 10. With regard to the prediction and analysis processes in Step SHOT and Step SH02 in FIG. 11 applied in the characteristic of each category, refer to the list of the prediction and analysis process applied in each category characteristic in FIG. 12.

[Step SH01] When a numerical portion is present in the edit history property value group extracted based on the condition by the component property characteristic data, an arithmetical progression or a cyclic rule is examined and, when regularity is present in the numerical portion, the next numerical value is predicted. When the numerical portion is not present, the same numerical value as the immediately previous numerical value is predicted.

[Step SH02] When a character portion is present in the edit history property value group extracted based on the condition by the component property characteristic data, the cyclic rule is examined and, when the regularity is present in the character portion, the next character string is predicted. When the character portion is not present, the same numerical value as the immediately previous character string is predicted.

[Step SH03] When both of the predicted numerical portion and character portion are present, a character string in which both of them are coupled is determined as the n-th candidate property predicted value. In addition, when one of the numerical portion and the character portion is present, the one of the numerical portion and the character portion is determined as the n-th candidate property predicted value. In the case where the predicted value cannot be determined, notification of the fact that the predicted value cannot be determined is provided.

Figure 13:
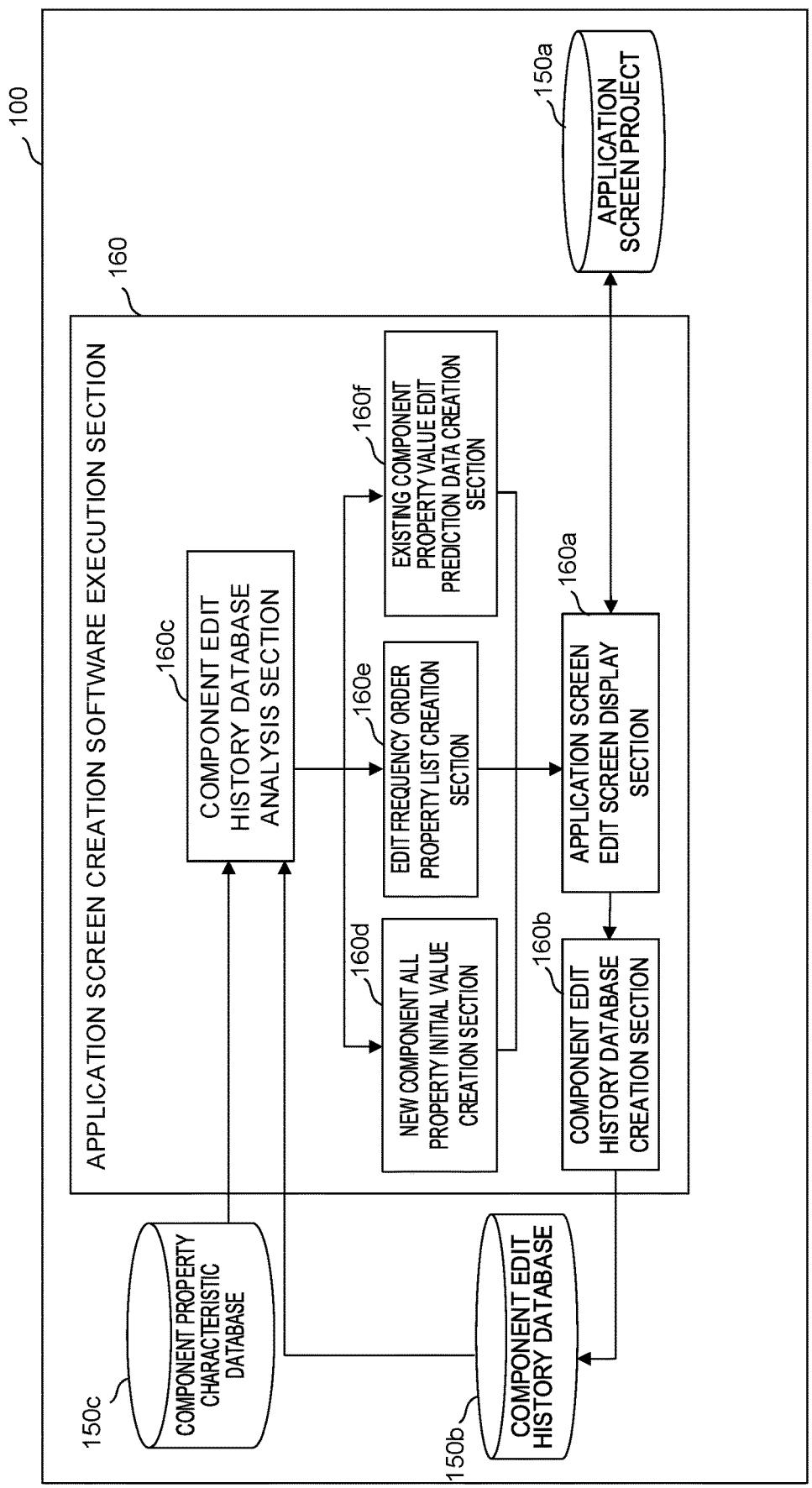
FIG. 13 is a functional block diagram showing a relationship among individual functional units of the screen creation apparatus of FIG. 1.

FIG. 13 is a functional block diagram showing the relationship among the individual functional units of the screen creation apparatus 100 of the present embodiment.

Although not shown in FIG. 13, the screen creation apparatus 100 includes configurations required for the operation of the apparatus such as a display, a keyboard, a program execution memory, a file storage disk, a data storage RAM, and an external input/output interface.

In the screen creation apparatus 100, various data sets are exchanged among the application screen creation software execution section 160, the component edit history database 150b, and the component property characteristic database 150c. The application screen creation software execution section 160 includes the component edit history database creation section 160b and the component edit history database analysis section 160c that manage the databases 150b and 150c.

When the application screen edit screen display section 160a displays the creation screen of the application screen project 150a in the display, and edits the property of the component in the displayed creation screen, the edit content and the number of times of the edit are chronologically collected in the component edit history database 150b by the component edit history database creation section 160b.

On the other hand, in the case where the application screen edit screen display section 160a creates a new component, the new component is prepared by using the new component all property initial value creation section 160d. Further, the new component all property initial value creation section 160d performs the prediction of the set values of all of the properties by causing the component edit history database analysis section 160c to operate, creates the new component in which the first candidate value is set as the initial value, and disposes the new component at the predicted position in the screen in process of creation.

The edit frequency order property list creation section 160e performs the list display based on ascending order of edit frequency obtained by causing the component edit history database analysis section 160c to operate for confirming the property setting content of the new component disposed in the application screen in process of creation.

The screen creator confirms the predicted set value with the displayed list and, in the case where the predicted set value is not a desired value, the desired value can be selected from the list of the second and subsequent candidate set values of the property. At this point, as the list of the second and subsequent candidate set values, the one created by the component edit history database analysis section 160c that is caused to operate by the existing component property value edit prediction data creation section 160f is displayed.

By the screen creation apparatus 100 configured in the above manner, the predicted values created by the analysis of the component property characteristic database and the component edit history database are set in all of the properties of a new component without performing the edit preparation operation in advance, and hence the time and labor related to the setting of the property value that is intensively performed at the time of new disposition and the time and labor when the property value of the existing component is confirmed or changed are significantly reduced.

Note that, although the embodiment of the present invention has been described, the present invention is not limited to the example of the embodiment described above, and can be implemented in various forms by making appropriate changes.

The invention claimed is:

1. A screen creation apparatus configured to execute an application screen creation software for creating an application screen in which a display component provided with a plurality of property items is disposed, the screen creation apparatus comprising:
   a memory containing
      a component edit history database that automatically records an edit history of each of the plurality of property items of the display component when the display component disposed on the application screen is edited, and
      a component property characteristic database in which, for each property item of the plurality of property items of the display component, a category characteristic of said property item, a property characteristic of said property item, and a prediction priority characteristic parameter of said property item are stored in association with each other; and
   a processor configured to
      perform an analysis of the component edit history database and the component property characteristic database,
      when a new display component based on the display component recorded in the component edit history database is disposed on the application screen, predict initial values for all of the plurality of property items of the new display component based on a result of the analysis of the component edit history database and the component property characteristic database, and
      create the application screen and cause a display to display the created application screen in which the new display component with the plurality of property items having the predicted initial values is disposed,
   wherein, for each property item of the plurality of property items,
      the property characteristic indicates an expected value of the initial value, and is based on a type of the display component and relations of the display component with respect to other display components disposed in the same application screen,
      the property characteristic classified by the category characteristic is a factor in the analysis of the component edit history database and the component property characteristic database and in setting the prediction priority characteristic parameter in each category, and
      the prediction priority characteristic parameter includes an operator's selection of an item to be prioritized when the prediction and the analysis are performed.

2. The screen creation apparatus according to claim 1, wherein the processor is further configured to
   create a display list in which all of the plurality of property items of the display component disposed in the application screen are arranged in descending order of edit frequency, based on the result of the analysis of the component edit history database, wherein
   the created display list is displayed when a value set for each of the plurality of property items of the display component disposed in the application screen is confirmed or edited.

3. The screen creation apparatus according to claim 1, wherein the processor is further configured to,
   when a property item of the plurality of property items of the display component disposed in the application screen is edited, create a predicted value candidate list of a second and subsequent predicted value candidates of the property item being edited, based on the result of the analysis of the component edit history database, and cause the display to display the predicted value candidate list.

4. The screen creation apparatus according to claim 1, wherein the processor is further configured to perform the analysis of the component edit history database in consideration of the prioritized item set in the prediction priority characteristic parameter.

* * * * *